US006453207B1

(12) United States Patent
Holmes et al.

(10) Patent No.: US 6,453,207 B1
(45) Date of Patent: Sep. 17, 2002

(54) METHOD, SYSTEM AND ARTICLE OF MANUFACTURE FOR OPERATING A PROCESS

(75) Inventors: Donald S. Holmes, P.O. Box 29, Duanesburg, NY (US) 12056; Peter M. Holmes, P.O. Box 40, Delanson, NY (US) 12053

(73) Assignees: Donald S. Holmes, Delanson, NY (US); Peter M. Holmes, Delanson, NY (US)

(*) Notice: Subject to any disclaimer, the term of this patent is extended or adjusted under 35 U.S.C. 154(b) by 0 days.

(21) Appl. No.: 09/345,350

(22) Filed: Jul. 1, 1999

(51) Int. Cl.[7] .................. G05B 11/32; G05B 13/02; G06F 19/00
(52) U.S. Cl. .................. 700/67; 700/28; 700/108
(58) Field of Search .................. 700/28, 32, 34, 700/39, 47, 67, 108; 702/109

(56) References Cited

U.S. PATENT DOCUMENTS

| | | | |
|---|---|---|---|
| 3,697,957 A | 10/1972 | Barron | 340/172.5 |
| 4,472,770 A | 9/1984 | Li | 364/148 |
| 5,247,460 A | 9/1993 | LaBudde | 364/552 |
| 5,442,562 A * | 8/1995 | Hopkins et al. | 700/108 |
| 5,546,329 A * | 8/1996 | Kurtzberg et al. | 702/83 |
| 5,621,665 A | 4/1997 | Ghosh et al. | 364/552 |
| 5,691,895 A | 11/1997 | Kurtzburg et al. | 364/148 |
| 5,710,700 A | 1/1998 | Kurtzburg et al. | 364/149 |
| 5,774,379 A | 6/1998 | Gross et al. | 364/576 |
| 5,781,430 A * | 7/1998 | Tsai | 700/29 |
| 5,835,627 A | 11/1998 | Higgins et al. | 382/167 |
| 5,862,054 A | 1/1999 | Li | 364/468.28 |
| 6,128,541 A * | 10/2000 | Junk | 455/125 |
| 6,144,885 A * | 11/2000 | Scarrah | 700/28 |
| 6,336,050 B1 * | 1/2002 | Amin et al. | 318/560 |

OTHER PUBLICATIONS

Holmes, Donald S. and Storey, Richard J., "Identifying and Monitoring the Key Factors for Manufacturing Quality Refractories," AISE Annual Convention, Sep. 21–24, 1987, Pittsburgh, PA, 12 pages.

Holmes, Donald S. and Mergen, A. Erhan, "Improving the Performance of the $T^2$ Control Chart," Marcel Dekker, Inc., Quality Engineering, 5(4), pp. 619–625 (1993).

* cited by examiner

Primary Examiner—Leo Picard
Assistant Examiner—Elliot Frank
(74) Attorney, Agent, or Firm—Heslin Rothenberg Farley & Mesiti P.C.; Wayne F. Reinke, Esq.

(57) ABSTRACT

A complex industrial process is operated via computer control. Process control data regarding multiple process control variables is collected, along with output data regarding one or more process output properties. One or more of the process control variables is altered for a predetermined time in order to determine which of the process control variables are affecting the one or more process output properties. An effect on the one or more output properties due to the altering is determined, and, if necessary, a set point for the one or more process control variables is altered based on the effect in order to improve the process.

48 Claims, 5 Drawing Sheets fig. 1 fig. 2 fig. 3 fig. 4 fig. 5 fig. 6 fig. 7 fig. 8

METHOD, SYSTEM AND ARTICLE OF MANUFACTURE FOR OPERATING A PROCESS

BACKGROUND OF THE INVENTION

1. Technical Field

The present invention generally relates to process operation or control. More particularly, the present invention relates to improving process efficiency.

2. Background Information

Existing systems for improving process efficiency, for example, manufacturing plant processes, assume the efficiency only depends on the variables that can be controlled. Since these existing systems ignore the uncontrolled variables, they attempt to find the perfect formula for optimum efficiency of plant operation. However, any plant will have variables that cannot be controlled. Further, these uncontrolled variables often have a significant effect on the efficiency of the plant. For example, in a manufacturing plant including furnaces, wind may have a significant effect on the efficiency of a given furnace on a particular day. Therefore, attempts to arrive at a formulation for plant efficiency that ignores uncontrolled variables is, by and large, illusory.

Thus, a need exists for a way to improve process efficiency that does not ignore uncontrolled variables.

SUMMARY OF THE INVENTION

Briefly, the present invention satisfies the need for a way to improve process efficiency that does not ignore uncontrolled variables by providing method, apparatus and article of manufacture that collect data for process control variables (i.e., controllable variables) and at least one process output property (e.g., an efficiency or quality control measure), experimenting with one or more of the process control variables, and determining an effect on the output property from the experiment. In this way, the invention seeks to constantly tweak the process to account for any effect, controllable or not, that may have undesired consequences, to the extent practicable through manipulation of the controllable variables.

The present invention provides, in a first aspect, a method of operating a process, comprising collecting process control data regarding a plurality of process control variables and output data regarding at least one process output property, automatically altering for a predetermined period of time at least one of the plurality of control variables, and determining an effect on the at least one aspect of the process due to the altering.

The present invention provides, in a second aspect, a system for performing the method of the first aspect.

The present invention provides, in a third aspect, an article of manufacture, comprising at least one computer usable medium having computer readable program code means for causing a computer to effect performance of the method of the first aspect.

These, and other objects, features and advantages of this invention will become apparent from the following detailed description of the various aspects of the invention taken in conjunction with the accompanying drawings.

DETAILED DESCRIPTION OF THE INVENTION

Figure 1:
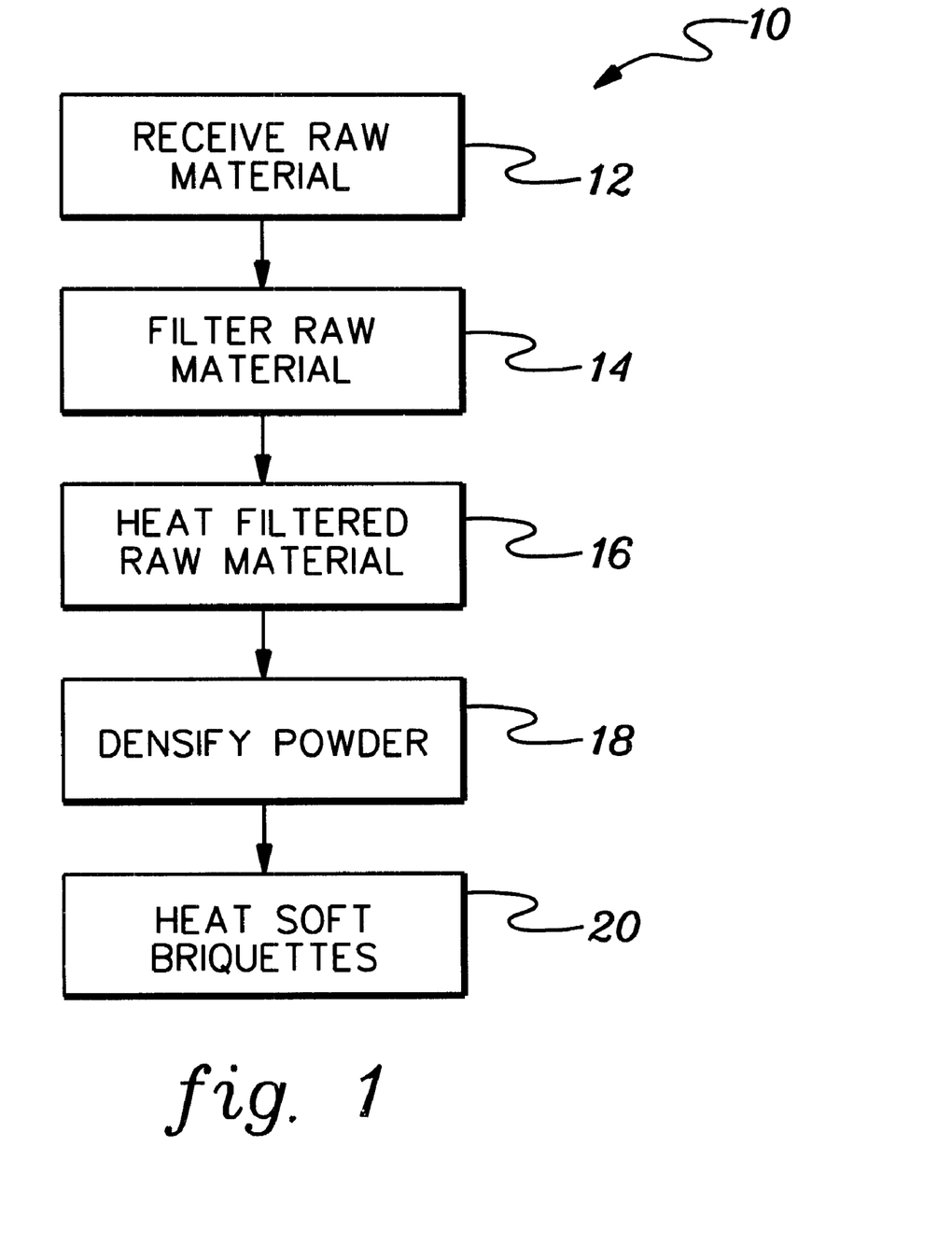
FIG. 1 is a flow diagram for an exemplary manufacturing process to which the present invention could be applied.

FIG. 1 is a flow diagram 10 for a magnesite (magnesium oxide) manufacturing process that the present invention (hereinafter referred to as "Proactive Process Improvement" or "PPI") could be used with. The raw material the process operates on is received from a chemical plant (step 12, "RECEIVE RAW MATERIAL") and resembles a dirty, milky slurry consisting of water for transportation through piping, other liquid and solids. The process turns the raw material into briquettes of magnesite, which are ground up by customers for use in bricks that can withstand high temperatures for use in such things as cement kilns.

Once received, the raw material is filtered to remove the water added for transportation (step 14, "FILTER RAW MATERIAL"). What is left resembles a thick, mud-like substance of magnesium hydroxide (Mg $(OH)_2$). The magnesium hydroxide is then heated (step 16, "HEAT FILTERED RAW MATERIAL") in a furnace to burn off the chemical water, leaving a fine powder of magnesium oxide (MgO) that will easily absorb moisture. The powder is then densified at a press into soft briquettes (step 18, "DENSIFY POWDER"). The soft briquettes are again heated in another furnace at a high temperature to harden them (step 20, "HEAT SOFT BRIQUETTES"). The hardened briquettes are then supplied to customers.

In a plant such as that described with respect to FIG. 1, a computer-based plant control system (24, FIG. 2) generally controls hundreds of process control variables in the plant, such as the temperature of a given furnace hearth, of which there are multiples within a given furnace. The same is true for most, if not all, complex processes. The temperature of each hearth is controlled by what is essentially a thermostat, each one having a target temperature or set point. As used herein, the term "set point" refers to a setting for a given process control variable within a process. The plant control system provides the set point to a hearth, and periodically reads the actual temperature of the hearth. The firing of the hearth is controlled to maintain the hearth temperature within a specified range of the set point. As with any thermostat, the actual temperature may vary by, for example, as much as 28° C. in either direction.

Figure 2:
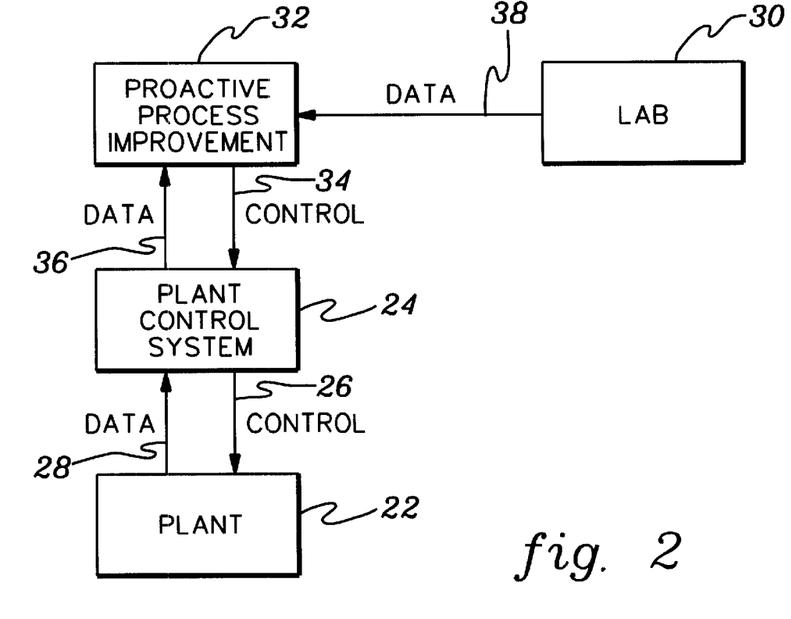
FIG. 2 is a flow diagram showing the flow of control and data in the plant of FIG. 1.

FIG. 2 is a simplified block diagram of the plant 22 described with respect to the flow diagram 10 of FIG. 1. The plant control system 24 logically sits on top of the controllable portions of the plant, providing control commands 26 to the physical portions of the plant represented by the process control variables. For example, the plant control system 24 might instruct a thermostat for a furnace hearth to increase the hearth temperature by a certain amount. Likewise, plant control system 24 receives process control data 28 from plant 22, for example, the current hearth thermostat temperature. A lab 30 may be on site or may be at another location, and serves to provide requested or predetermined output data regarding certain output properties of the magnesite being produced that is helpful in determining such things as efficiency or for quality control purposes. For example, the lab might provide data regarding the percent moisture or particle size distribution of the filtered raw material. As another example, the lab might provide data regarding the ability to form briquettes, or the "activity," somewhat akin to acidity, of the fine powder produced after the first heating. Such a lab might be automated, manual, or a combination of the two. An automated or semi-automated lab could include, for example, automated testing equipment or automated measurement equipment which has direct computer connect capability. The data may also be manually entered into a computer program, such as a spread sheet, for transfer to the PPI system when appropriate. Even further, the process output data may be captured by a completely automated, on-line test or measurement device such as an on-line moisture sensing system or an on-line thickness gage.

The present invention, Proactive Process Improvement (PPI) 32, logically sits on top of or is part of the plant control system 24. PPI provides the set points 34 to the plant control system for the process control variables, and receives process control data 36 therefrom. In addition, PPI receives the output data 38 from the lab 30 described above. In existing systems, the lab output data might be, for example, periodically reviewed by a multi-person committee that examines the data to identify areas for improvement, and develops a plan to achieve the improvement. The plan is then implemented through, for example, changes to the plant and/or the plant control system. PPI renders such committees obsolete.

Figure 3:
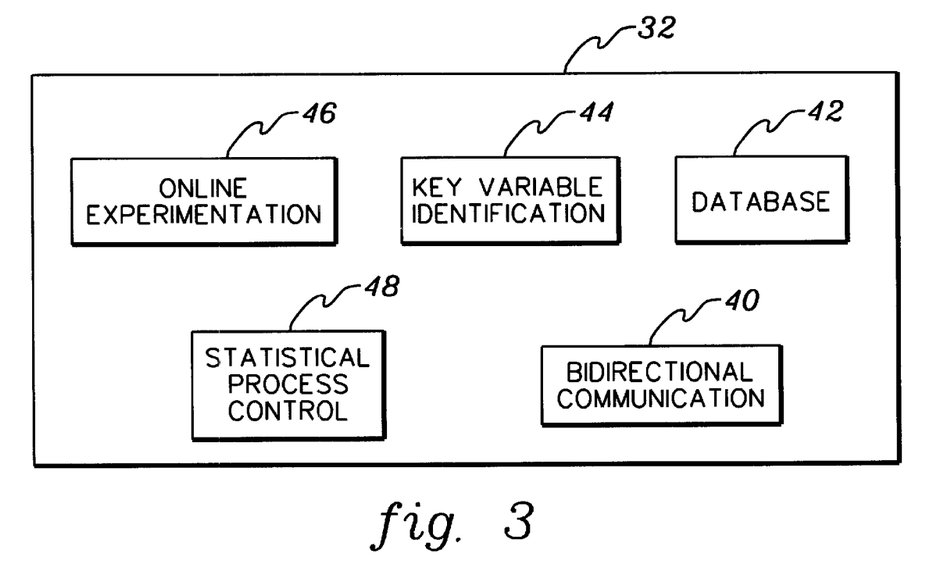
FIG. 3 is a block diagram of the major components of the present invention.

FIG. 3 is a block diagram of the major components of PPI 32. PPI is comprised of a bidirectional communication component 40, a database component 42, a key variable identification component 44, an online experimentation component 46, and an optional online statistical process control component 48. PPI 32 may be implemented, for example, as a computer program.

The bidirectional communication component 40 is custom connected through the computer on which it is running to allow for communications with the particular plant control system. That is, although the substance of the communication component is not changed, the physical connection to a given plant control system is defined by the plant control system. Thus, some physical and/or other customization may be required, depending on the plant control system.

Process control data may be updated frequently, for example, every five seconds. Process output data, on the other hand, may be generated at a much slower rate, for example, every hour. PPI synchronizes these data in order that the process control variables be guided to achieve the objective (maximize, minimize or hit target value) for the process output variables, and to overcome any differences in their sampling rates. For example, assume that part of the output data includes data regarding the activity of the fine powder. The activity data, which is generated every two hours, must be synchronized with the temperatures of the various hearths which are captured every fifteen seconds. Other control variables which are candidates for inclusion in this synchronization process example are: feed rate to the kiln and rotation speed. The data generation rates for these variables may well be different from those for the hearth temperatures. The raw data is stored in temporary storage (e.g., RAM) and also stored in a database both for retrieval when needed by PPI and for later, off-line, historical analyses.

The data is stored in the component 42 database to facilitate access. One example of a commercially available database that could be used with PPI is INFORMIX/SE by Informix Software, Inc., Menlo Park, Calif.

Upon start-up of PPI, either the plant needs to run for a predetermined period of time in order to develop enough raw data to be useful, or it needs to be provided with initial settings for all the process control variables. The initial settings could be, for example, based on a preliminary review of the particular plant in conjunction with historical data compiled for the plant.

The key variable identification component 44 periodically determines which of the process control data from the plant control system is having a significant effect on the output data from the lab. For example, the key variable identifier could determine, for example, once an hour, one or more of the process control data from the plant control system having the greatest effect on the activity of the fine powder. The determination of what is "significant" will of course depend on the situation, but could, for example, be determined by ranking the process control variables for the effect. Preferably, the key variable identifier identifies at least the top two ranked process control variables affecting the output data of interest, in this case, the activity of the fine powder. However, it will be understood that more than two of the process control variables could be used, although if more variables are used, it will increase the complexity of the next step in the process, the online experimentation. There are commercially available software packages useful for key variable identification, for example, Classification and Regression Trees (CART) and Multvariate Analysis with Regression Splines (MARS), available from Salford Systems of San Diego, Calif.

Preferably, the key variable identification component employs a multidimensional, crosstabulation approach, which uses an information theory metric in conjunction with a search engine as described below operating on the database to determine which of the control variables have major influence on any selected process output variable. As used herein, "multidimensional" means that more than two variables are to be included in the analysis; "crosstabulation" means that each of the continuous variables are formed into classes so that the number of data points in the various, multidimensional combinations of classes may be obtained (discrete variables do not necessarily require such classification); and "information theory metric" means that a probability-based measure is used to determine the amount of information contained by combinations of control variables (one at a time, two at a time, etc.) relative to the variation of the process output variable.

The functionality of the preferred on-line search engine will now be described in detail. Each variable used in the analysis is classified into classes constructed in one of two ways: (a) constructed to have approximately equal counts in each class, usually resulting in unequal class widths; or (b) constructed to have equal class widths. Classification method (a) is preferred for PPI. Given the counts in the various classes, an information theory metric known as "Mutual Information Content"(MIC) is used to decide which control variable (or combination of control variables) has a significant impact on the process output variable. For more detail regarding MIC, see Holmes and Storey, "Identifying and Monitoring the Key Factors for Manufacturing Quality Refractories," AISE Annual Convention, September 1987, which is herein incorporated by reference in its entirety. Though not preferred, other search engines could be used, for example, those based on regression analysis or chi-square metrics.

Once the control variable (or variables) is determined, the maximum value the MIC could attain if the process output variable could be completely described with the set of control variables being considered is determined. A stepwise (binary) search is done to determine which control variable singly generates the largest MIC relative to the process output variable. The pairs (or triples) of control variables are then sought that generate the largest MIC. This continues until the user selected percentage of the maximum MIC has been achieved. From there, an ordered list of control variables having the greatest impact on the process output variable can be generated.

The preferred search engine when used in off-line mode has the added ability to consider control variables in the order they occur in the whole process, rather than just as they occur at a particular stage of the process. This enables the user to determine the earliest point, in the order of the process, where changes in the process output variable occur. This ordered approach can be from the front end of the process to the back, or from the back to the front.

The data below in Table I was furnished from a study of PPI by a brick-making plant that used the preferred key variable identifier to generate sizeable quality improvements. The purpose of the study was to determine which of the control variables (various % on screens, tap density, initial and final batch temperatures) had the most significant influence on the third output variable, q3 (Viscosity-1).

The control variable in this example given as various "% on screens" refers to material that is run through a series of screens with various mesh sizes, with "c1" being the largest and "c4" being the smallest mesh size. Once the screening is completed, the weight of the portion remaining on each screen is determined. These weights are then converted to a percent-by-weight of the material that remains on each screen, with an acceptable percent-by-weight typically being specified.

In Table I below, the following are the Control Variables and Output Variables: c1=% ON SCREEN-1 (% by weight remaining); c2=% ON SCREEN-2 (% by weight remaining); c3=% ON SCREEN-3 (% by weight remaining); c4=% ON SCREEN-4 (% by weight remaining); c5=TAP DENSITY (g/cm$^3$); c6=INIT BAT TEMP (°C.); c7=FINAL BAT TEMP (°C.); q1=FLOW-1 (inches/minute); q2=FLOW-2 (inches/minute); q3=VISCOSITY-1 (centipoise); q4=VISCOSITY-2 (centipoise); q5=SLIP DENSITY-1 (g/cm$^3$); and q6=SLIP DENSITY-2 (g/cm$^3$).

TABLE I

| Control Variables | | | | | | | Output Variables | | | | | | |
|---|---|---|---|---|---|---|---|---|---|---|---|---|---|
| c1 | c2 | c3 | c4 | c5 | c6 | c7 | q1 | q2 | q3 | q4 | q5 | q6 | date |
| 18.19 | 20.98 | 10.41 | 17.72 | 2.24 | 22.34 | 19.45 | 11.83 | 14.52 | 2145 | 16060 | 4.71 | 4.59 | 1/19 |
| 10.55 | 19.19 | 11.48 | 23.10 | 2.09 | 27.00 | 21.01 | 12.74 | 13.20 | 3740 | 24310 | 4.61 | 4.54 | 2/15 |
| 12.21 | 16.81 | 11.48 | 22.62 | 2.14 | 23.27 | 19.45 | 13.65 | 14.52 | 2948 | 19910 | 4.67 | 4.59 | 2/16 |
| 12.38 | 20.57 | 11.41 | 21.86 | 2.17 | 24.21 | 20.23 | 10.92 | 14.52 | 2376 | 13200 | 4.64 | 4.59 | 2/21 |
| 17.73 | 22.67 | 10.98 | 20.18 | 2.15 | 24.21 | 20.23 | 10.92 | 14.52 | 2168 | 12870 | 4.66 | 4.60 | 2/23 |
| 11.24 | 23.67 | 12.74 | 20.97 | 2.17 | 24.21 | 20.23 | 10.01 | 14.52 | 3630 | 18150 | 4.66 | 4.63 | 2/25 |
| 10.82 | 23.10 | 11.98 | 21.72 | 2.17 | 25.14 | 21.01 | 11.83 | 13.20 | 2761 | 17930 | 4.64 | 4.57 | 3/04 |
| 11.52 | 19.31 | 11.67 | 22.75 | 2.15 | 25.14 | 21.01 | 13.65 | 13.20 | 3355 | 22000 | 4.67 | 4.55 | 3/09 |
| 13.41 | 17.97 | 10.97 | 21.89 | 2.18 | 24.21 | 20.23 | 10.92 | 15.84 | 3135 | 15675 | 4.66 | 4.63 | 3/13 |
| 12.62 | 19.25 | 11.80 | 20.79 | 2.16 | 24.21 | 20.23 | 10.01 | 14.52 | 2805 | 14025 | 4.64 | 4.62 | 3/16 |
| 12.55 | 21.47 | 10.70 | 21.00 | 2.16 | 26.07 | 21.01 | 11.83 | 14.52 | 2926 | 16500 | 4.65 | 4.59 | 3/19 |
| 12.48 | 22.85 | 10.31 | 21.35 | 2.06 | 26.07 | 21.01 | 10.92 | 14.52 | 3410 | 18590 | 4.67 | 4.62 | 3/20 |
| 12.14 | 21.06 | 11.70 | 21.34 | 2.11 | 23.27 | 19.45 | 16.38 | 19.80 | 3201 | 21450 | 4.69 | 4.57 | 3/25 |
| 15.28 | 19.90 | 10.12 | 20.18 | 2.08 | 26.07 | 21.01 | 11.83 | 14.52 | 3201 | 18920 | 4.67 | 4.60 | 3/30 |
| 13.49 | 17.97 | 10.53 | 20.65 | 2.10 | 25.14 | 21.01 | 14.56 | 14.52 | 3960 | 26730 | 4.67 | 4.57 | 4/01 |
| 13.21 | 18.82 | 9.53 | 21.67 | 2.09 | 25.14 | 21.01 | 16.38 | 14.52 | 2706 | 18865 | 4.65 | 4.54 | 4/06 |
| 14.70 | 21.20 | 9.46 | 20.89 | 2.05 | 24.21 | 20.23 | 13.65 | 14.52 | 2596 | 15565 | 4.69 | 4.59 | 4/09 |
| 11.64 | 22.91 | 11.84 | 20.56 | 2.08 | 25.14 | 21.01 | 10.92 | 13.20 | 2772 | 15675 | 4.65 | 4.60 | 4/13 |
| 11.07 | 21.61 | 11.82 | 20.91 | 2.15 | 25.14 | 21.01 | 10.92 | 13.20 | 3069 | 18975 | 4.65 | 4.59 | 4/18 |
| 13.41 | 15.51 | 8.23 | 24.88 | 2.12 | 25.14 | 21.01 | 14.56 | 13.20 | 4059 | 27995 | 4.65 | 4.54 | 4/25 |
| 13.83 | 14.75 | 9.91 | 24.38 | 2.18 | 25.14 | 21.01 | 12.74 | 13.20 | 3652 | 20625 | 4.64 | 4.57 | 4/26 |
| 14.62 | 18.62 | 8.99 | 22.17 | 2.16 | 25.14 | 21.01 | 13.65 | 14.52 | 3212 | 22220 | 4.65 | 4.55 | 4/28 |
| 13.77 | 20.19 | 10.12 | 22.73 | 2.15 | 25.14 | 21.01 | 10.92 | 14.52 | 2552 | 13750 | 4.60 | 4.53 | 5/02 |
| 15.17 | 19.25 | 8.79 | 20.85 | 2.16 | 23.27 | 19.45 | 18.20 | 14.52 | 2315 | 21395 | 4.64 | 4.52 | 5/08 |
| 17.50 | 21.12 | 8.61 | 18.37 | 2.00 | 24.21 | 20.23 | 12.74 | 14.52 | 2024 | 18700 | 4.61 | 4.52 | 5/11 |

TABLE I-continued

| Control Variables | | | | | | | Output Variables | | | | | | |
|---|---|---|---|---|---|---|---|---|---|---|---|---|---|
| c1 | c2 | c3 | c4 | c5 | c6 | c7 | q1 | q2 | q3 | q4 | q5 | q6 | date |
| 11.07 | 27.86 | 12.10 | 19.58 | 2.04 | 25.14 | 21.01 | 10.92 | 14.52 | 2272 | 13860 | 4.61 | 4.58 | 5/13 |
| 10.71 | 25.36 | 12.48 | 19.07 | 2.13 | 25.14 | 21.01 | 11.83 | 14.52 | 2173 | 15730 | 4.61 | 4.53 | 5/17 |

The key variable identification program results indicated:
1. the fourth control variable (% on screen-4) accounts for 48% of the information available about Viscosity-1; and
2. the fourth and first (% on screen-1) control variables together account for 84% of the information available about Viscosity-1.

For more detail regarding the percentages determined, see the Holmes and Storey article noted above. The results above established the importance of screen analysis on the variable Viscosity-1 and appropriate control procedures were initiated. Substantial quality improvements were obtained.

Alternatively, the key variable identification component could be designed to use multiple regression to determine which plant control system variables have a significant effect on the lab data of interest. One skilled in the art will be familiar with multiple regression. Briefly, multiple regression is a method for fitting a function of the form:

---
Output Variable = Some function of the multiple control variables
$$y = f(x_1, x_2, x_3, x_4, x_5 ...),$$
e.g., $y = a_0 + a_1 * x_1 + a_2 * x_2,$
--- and determining the statistical significance of the equation's coefficients. The equation is often referred to as the "model." The method of estimating the coefficients from a given data set is based on selecting the constants in such a fashion that the sum of the squares of the differences between the values calculated from the equation and the values observed is minimized. The CART and MARS programs discussed above use regression analysis in one form or another. The approach that is preferred is "model free"—no model of the "response surface" is required.

The online experimentation component 46 experiments with the set points for the process control variables to achieve the desired effect on the process output property of interest at the time. It does this by automatically altering for a predetermined period of time the set point for one or more of the process control variables identified by the key variable identification component as having a significant effect on the output data of interest. The length of time the set point(s) is (are) altered depends of course on the particular process and how long it will likely take for the effects of the altering to be determined, as reflected in updated output data. Preferably, the online experimentation is performed in accordance with the principles of what is known as "Evolutionary Operation" or "EVOP." However, it will be understood that other experimental approaches may be used. For example, full factorial designs with no central point or fractional factorial designs such as Fisher-Yates, Plackett-Burman, or Taguchi could be incorporated in the ProActive Process Improvement System. An in-depth explanation of EVOP can be found in the book "Evolutionary Operation, A Statistical Method for Process Improvement," George E. Box and Norman R. Draper, Wiley Series in Probability and Mathematical Statistics, John Wiley & Sons, Inc., 1969, which is herein incorporated by reference in its entirety.

Figure 4:
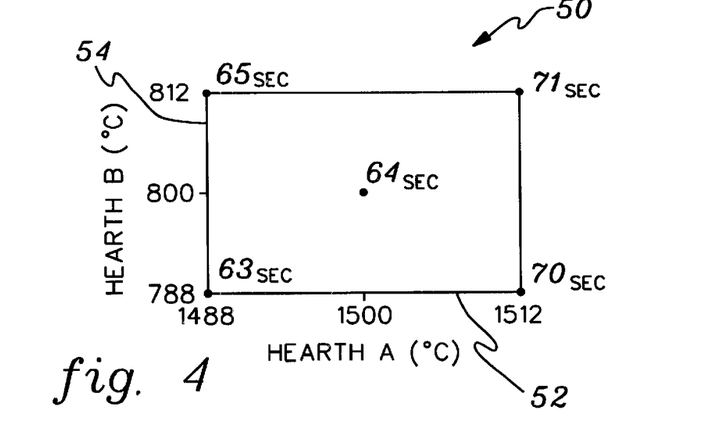
FIGS. 4 and 5 are graphs depicting online experimentation in accordance with the present invention.

EVOP takes several forms. Basic EVOP has two forms, standard and simplex. Standard EVOP will be explained with reference to FIG. 4, and assuming that two key variables are chosen. Shown in FIG. 4 is a graph 50 with Hearth A temperature (in centigrade) along the x axis 52, Hearth B temperature along they axis 54, and activity data at the middle and four corners where the temperatures intersect. Assume that current operating conditions include a Hearth A temperature of 1500° C., a Hearth B temperature of 800° C., and an activity of 64 (seconds). Assume also that the predetermined permissible experimental range for Hearth A is from 1488° C. to 1512° C., and the range for Hearth B is from 788° C. to 812° C.. Therefore, the online experimentation component will cause the plant control system to alter the Hearth A and Hearth B temperatures at the extremes of the allowed ranges, i.e., at the four corners of the graph. At each of the corners, the activity is determined. It will be understood that standard EVOP design calls for the center and four corners of the graph (five conditions) where two variables are concerned. If, for example, three variables were used, the graph would become a three-dimensional cube with nine conditions (the center for current conditions, and the eight corners of the cube). Beyond three variables, the EVOP methodology becomes very complicated and most likely impractical for real-time use, since so many conditions would have to be tested. For example, each time a new set point is provided to a hearth, it takes time for the hearth to actually reach that temperature. Thus, where two variables are concerned, in this example, one might leave the new set points for an hour or whatever time is agreed upon.

Assume now that the testing cycle resulted in activities of 63 in the lower left corner of the graph, 65 in the upper left corner of the graph, 71 in the upper right corner of the graph, and 70 in the lower right quarter of the graph. The question then becomes whether to change the set points for either hearth to improve activity, and if so, which condition provided the most improvement. Assuming that maximizing the activity is the goal (versus minimizing or attempting to hit a target), the condition resulting in the highest activity will be chosen. In this case, the set point for Hearth A would be set to 1512° C., and the set point for Hearth B would be set to 812° C. Unless some unexpected change in the system takes place, these temperatures will be maintained until the next cycle of key variable identification, and possibly beyond that time if the temperatures of Hearth A and Hearth B are not determined to be one of the top variables affecting activity and that activity continues to be a process output property of interest.

Figure 5:
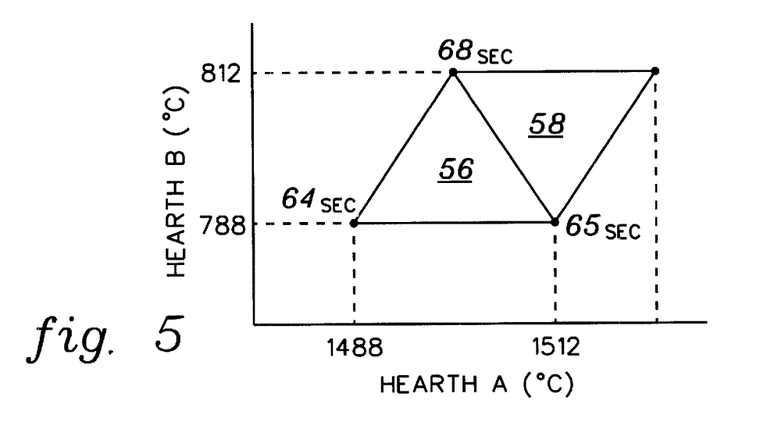

Simplex EVOP uses a series of interconnected triangles to, for example, maximize activity as in the Standard EVOP example above. Any of the three corners can be designated as the current operating conditions. If, for example, the activities at the three conditions (the corners of triangle 56 in FIG. 5) were 64 at the lower left corner, 68 at the top corner, and 65 at the lower right corner, then the triangle rotates away from the worst condition. In this case, since we are attempting to maximize activity, the lower left corner is the worst condition, and rotating the triangle away from that point results in triangle 58. This type of experiment can be understood as chasing the goal, rather than trying to model the goal, which is, for example, what multiple regression analysis in existing plant control systems might do. Again, the present invention is based on a realization that plant efficiency is a moving target, due in large part to uncontrolled or uncontrollable variables.

If a situation occurred, for example, where all four corners in the standard EVOP experimentation scheme resulted in the same level of activity, it may be the case that the experiment is situated in a "plateau" area of operation and needs to move. One way to do this is to use what is known as Rotating EVOP (also know as "ROVOP"), where a larger offset graph (i.e., rotated 45° C. with respect to the initial graph) is used, retaining a common center. This results in a new set of conditions on a wider scale. Alternatively, the larger graph can simply be made concentric with the initial one. Otherwise, ROVOP operates the same as Standard EVOP.

Still one other example of an operational principle for the online experimentation component is known as Random Evolutionary Operations ("REVOP"), which uses random set points and observes the results. This method is not preferred, since it is not systematic or methodical. In addition, REVOP has the increased potential, if strict limits are not set, of causing damage to the plant and/or producing unusable product.

The optional online statistical process control component 48 produces control charts, which one skilled in the art will be familiar with. A given control chart merely tracks one or more process control data and/or output data over time. This component is not necessary for the operation of the invention, but industry is generally accustomed to having control charts, and they do provide information in a more visual form, which can be useful. As one skilled in the art will know, control charts make a statistical significance type of analysis on data which is typically collected over a period of time. Usually, control charts are set up in such a fashion that the probability of concluding the process average, for example, has changed when in fact it has not, is approximately 0.003 (referred to as "three sigma"). For measurement type of data, one generally would create two control charts: one to check the average value of the process; and another to check the variability of the process.

Figure 7:
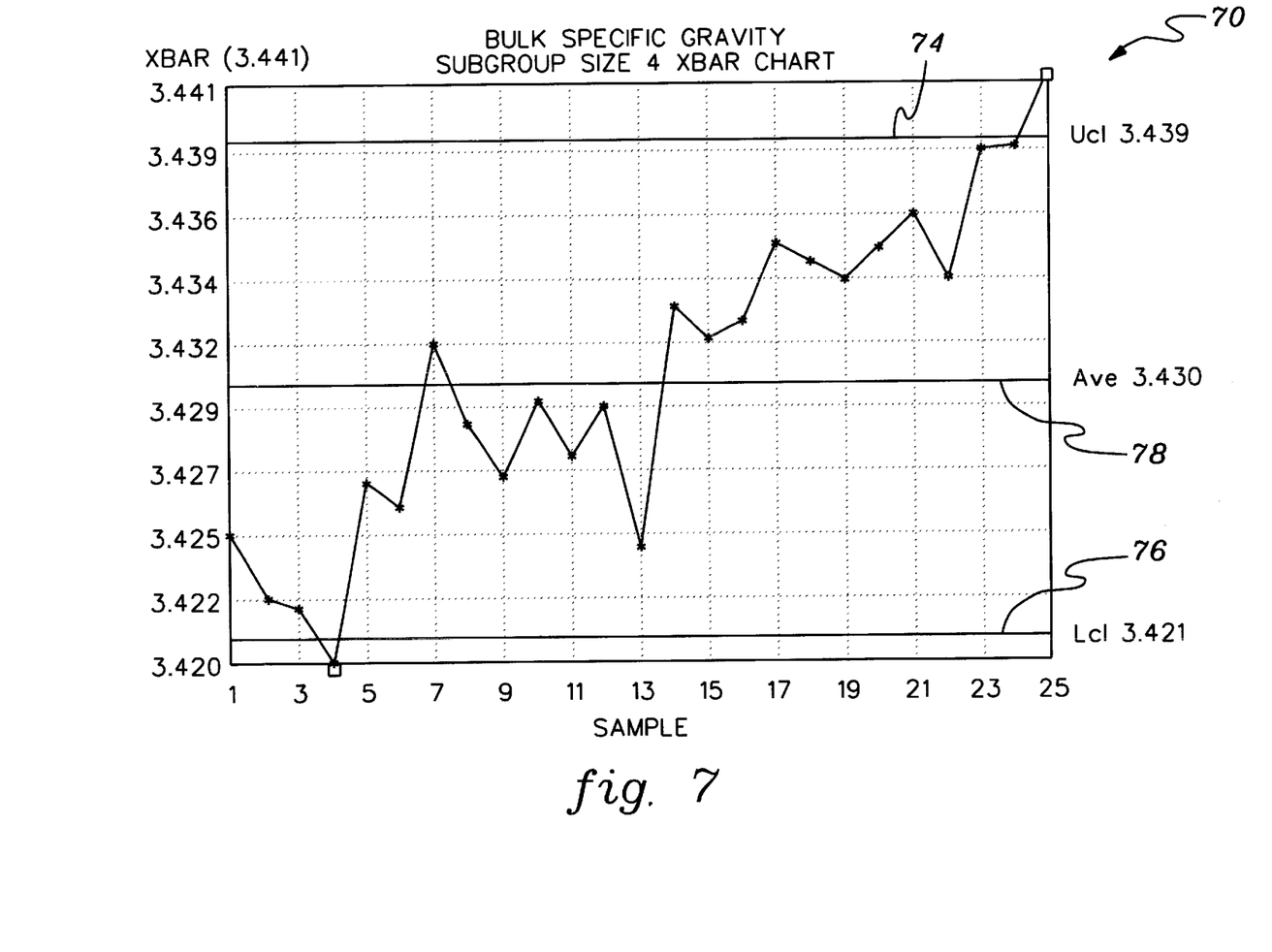
FIGS. 7 and 8 are examples of control charts that can be generated by the present invention.
Figure 8:
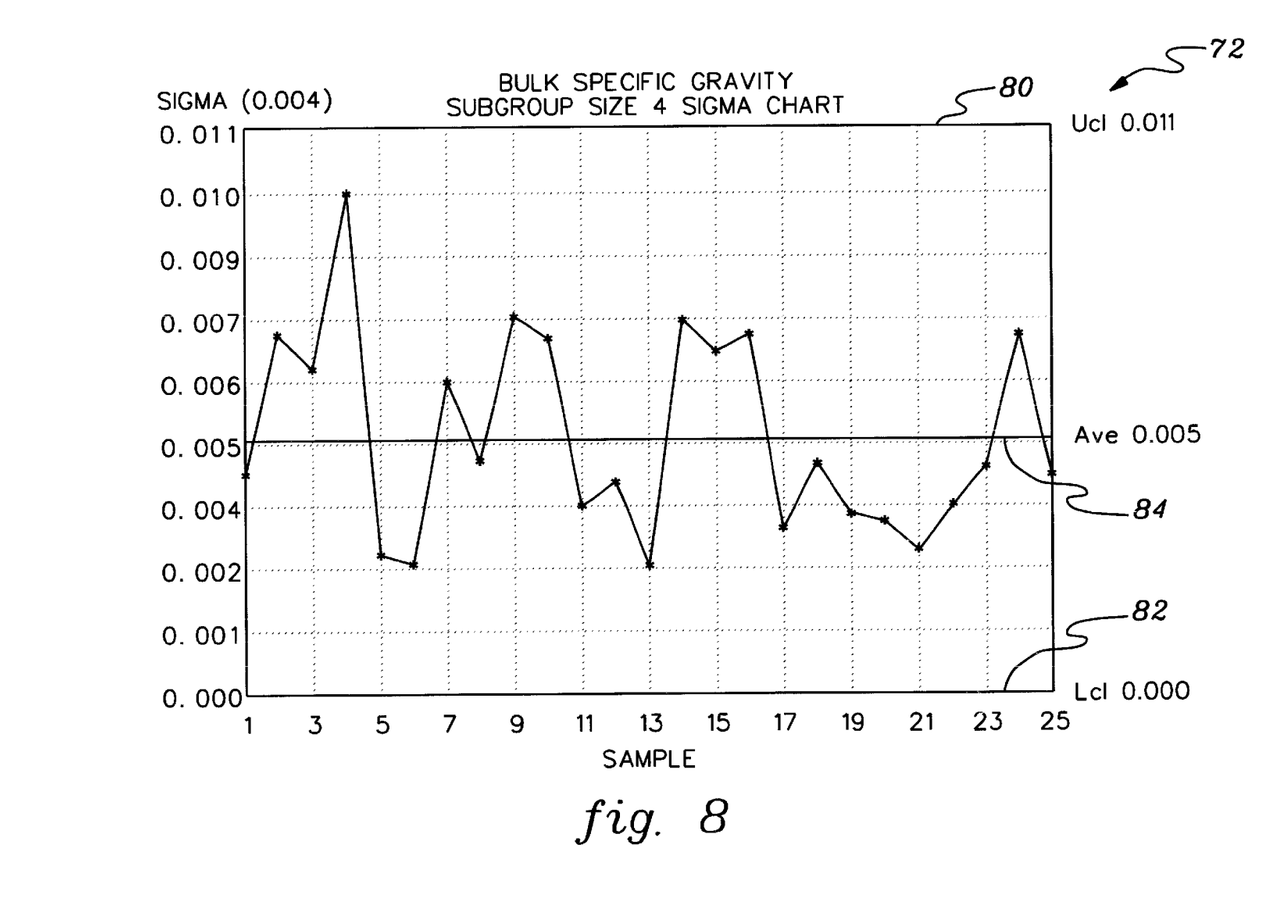

For example, FIGS. 7 and 8 are control charts 70 and 72, respectively, for bulk specific gravity based on exemplary sample data. Each sample group (1–25) in FIG. 7 is an average of four data, while each sample in FIG. 8 is an average standard deviation. In FIG. 7, there is an upper control limit 74, a lower control limit 76 and an average 78. Similarly, control chart 72 includes an upper control limit 80, a lower control limit 82 and an average 84.

In our example above, the Key Variable Identification (KVI) component is run periodically, perhaps once an hour. However, it will be understood that the KVI component could be run on a demand basis. Further, if run periodically, it may also be advisable to check for a flag between KVI runs indicating that something is happening having a significant effect on the plant and that KVI should be run outside normal run times. The flag is a predetermined statistically significant change in the online experimentation data for a given process control variable. One such statistical test involves the ratio of the observed variance to an estimate of what the variance would have been if there were no changes in variables not included in the experiment. For example, if no changes are being made to the set points in the plant, and the activity for the fine powder produced at the first set of furnaces suddenly goes from 64 to 85 at a given set of conditions within the EVOP process, then something of significance is happening. What is significant will depend on varying factors, such as, for instance, what is being produced, historical information for the plant, and the particular process being used.

Another way to determine if KVI should be run outside the norm is to periodically check the process control data for the next N (e.g., 5) number of process control variables ranked in the last KVI run for statistically significant changes. This can be done, for example, with what is known as a "T-Squared" analysis. As one skilled in the art will know, this analysis was developed by Hotelling in the mid-1930s, and checks for statistically significant differences amongst observations of multiple (possibly correlated) variables. Further information regarding this statistical analysis can be found in, for example, Holmes and Mergen, "Improving the Performance of the T2 Control Chart," Quality Engineering, Volume 5, Issue 4, 1993.

Figure 6:
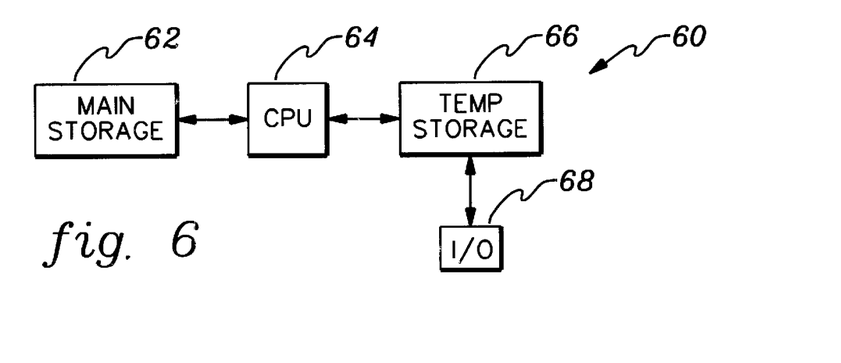
FIG. 6 is a block diagram of one example of a computer useful with the present invention.

In the preferred embodiment, PPI is a computer-based implementation. One example of a computer 60 that PPI can work with is depicted in simplified block diagram form in FIG. 6. However, it will be understood that PPI could be implemented in other forms, such as, for example, electronic hardware (logic elements, transistors, etc.). Computer 60 comprises main storage 62, central processing unit 64, temporary storage 66 and input/output devices 68. Main storage 62 would store the PPI program and database, and could be, for example, a hard disk drive or some other form of mass storage. CPU 64 could be, for example, a 500 MHz PENTIUMTM™ III processor by Intel. Temporary storage could be, for example, 128 MB of Synchronous Dynamic Random Access Memory (SDRAM). Finally, input/output devices 68 could include, for example, a keyboard, a mouse or other pointing device, a microphone, a monitor, serial port, ethernet port, and/or other components.

In addition, PPI, when implemented as a computer program, is preferably run on a computer with a multitasking operating system considered to have acceptable stability for the particular process involved. For example, UNIX or a UNIX-based operating system might be acceptable for some processes.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method of operating a process, comprising:
   collecting process control data regarding a plurality of process control variables;
   collecting output data regarding at least one process output property;
   automatically altering at least two of the plurality of process control variables in accordance with Evolutionary Operations (EVOP); and
   determining an effect on the at least one process output property due to the altering.

2. The method of claim 1, wherein the process is controlled by an automated control system, and wherein the collecting process control data comprises collecting by the automated control system.

3. The method of claim 1, wherein the collecting output data comprises collecting by measurement equipment.

4. The method of claim 1, wherein the automatically altering comprises automatically choosing the at least one of the plurality of process control variables based on significance of the effect on the at least one process output property.

5. The method of claim 4, wherein the automatically choosing comprises automatically synchronizing the process control data and the output data.

6. The method of claim 5, wherein the automatically choosing further comprises automatically ranking the plurality of process control variables for the effect.

7. The method of claim 6, wherein the automatically choosing further comprises automatically identifying the at least one of the plurality of process control variables based on the ranking.

8. The method of claim 1, wherein the automatically altering comprises automatically altering the at least two of the plurality of process control variables in accordance with Standard EVOP.

9. The method of claim 1, wherein the automatically altering comprises automatically altering the at least two of the plurality of process control variables in accordance with Simplex EVOP.

10. The method of claim 1, wherein the automatically altering comprises automatically altering the at least two of the plurality of process control variables in accordance with Rotaing Evolutionary Operation (ROVOP).

11. The method of claim 1, wherein the automatically altering comprises automatically altering the at least two of the plurality of process control variable in accordance with Random Evolutionary Operations (REVOP).

12. The method of claim 1, further comprising determining whether to alter a set point for each of the at least two of the plurality of process control variables based on the effect.

13. The method of claim 1, wherein the collecting process control data and the collecting output data comprise building a database.

14. A system for operating a process, comprising:
   means for collecting process control data regarding a plurality of process control variables;
   means for collecting output data regarding at least one process output property;
   means for automatically altering at least two of the plurality of process control variables in accordance with Evolutionary Operations (EVOP); and
   means for determining an effect on the at least one process output property due to the altering.

15. The system of claim 14, further comprising an automated control system for controlling the process, wherein the means for collecting process control data comprises the automated control system.

16. The system of claim 14, wherein the means for collecting output data comprises measurement equipment.

17. The system of claim 14, wherein the means for automatically altering comprises means for automatically choosing the at least one of the plurality of process control variables based on significance of the effect on the at least one process output property.

18. The system of claim 17, wherein the means for automatically choosing comprises means for automatically synchronizing the process control data and the output data.

19. The system of claim 18, wherein the means for automatically choosing further comprises means for automatically ranking the plurality of process control variables for the effect.

20. The system of claim 19, wherein the means for automatically choosing further comprises means for automatically identifying the at least one of the plurality of process control variables based on the ranking.

21. The system of claim 14, wherein the means for automatically altering comprises means for automatically altering the at least two of the plurality of process control variables in accordance with Standard EVOP.

22. The system of claim 14, wherein the means for automatically altering comprises means for automatically altering the at least two of the plurality of process control variables in accordance with Simplex EVOP.

23. The system of claim 14, wherein the means for automatically altering comprises means for automatically altering the at least two of the plurality of process control variables in accordance with Rotating Evolutionary Operations (ROVOP).

24. The system of claim 14, wherein the means for automatically altering comprises means for automatically altering the least two of the plurality of process control variables in accordance with Random Evolutionary Operations (REVOP).

25. The system of claim 14, further comprises means for determining whether to alter a set point for each of the at least two of the plurality of process control variables based on the effect.

26. The system of claim 14, wherein the means for collecting process control data and the means for collecting output data comprise means for building a database.

27. An article of manufacture, comprising:
    at least one computer usable medium having computer readable program code means for causing the operating of a process, the computer readable program code means in the article of manufacture comprising:
        computer readable program code means for causing a computer to effect collecting process control data regarding a plurality of process control variables;
        computer readable program code means for causing a computer to effect collecting output data regarding at least one process output property;
        computer readable program code means for causing a computer to effect altering at least two of the plurality of process control variables in accordance with Evolutionary Operations (EVOP); and
        computer readable program code means for causing a computer to effect determining an effect on the at least one process output property due to the altering.

28. The article of manufacture of claim 27, wherein the process is controlled by an automated control system, wherein the computer readable program code means for causing a computer to effect collecting process control data comprises computer readable program code means for causing a computer to effect the collecting by the automated control system.

29. The article of manufacture of claim 27, wherein the computer readable program code means for causing a computer to effect collecting output data comprises computer readable program code means for causing a computer to effect collecting by automated measurement equipment.

30. The article of manufacture of claim 27, wherein the computer readable program code means for causing a computer to effect altering comprises computer readable program code means for causing a computer to effect choosing the at least one of the plurality of process control variables based on significance of the effect on the at least one process output property.

31. The article of manufacture of claim 30, wherein the computer readable program code means for causing a computer to effect choosing comprises computer readable program code means for causing a computer to effect synchronizing the process control data and the output data.

32. The article of manufacture of claim 31, wherein the computer readable program code means for causing a computer to effect choosing further comprises computer readable program code means for causing a computer to effect ranking the plurality of process control variables for the effect.

33. The article of manufacture of claim 32, wherein the computer readable program code means for causing a computer to effect choosing further comprises computer readable program code means for causing a computer to effect identifying the at least one of the plurality of process control variables based on the ranking.

34. The article manufacture of claim 27, wherein the computer readable program code means for causing a computer to effect altering comprises computer readable program code means for causing a computer to effect altering the at least two of the plurality of proces control variables in accordance with Standard EVOP.

35. The article manufacture of claim 27, wherein the computer readable program code means for causing a computer to effect altering the at least two of the plurality process control variables in accordance with Simplex EVOP.

36. The article of manufacture of claim 27, wherein the computer readable program code means for causing a computer to effect altering comprises computer readable program code means for causing a computer to effect altering the at least two of the plurality of process control variables in accordance with Rotating Evolutionary Operations (ROVOP).

37. The article of manufacture of claim 27, further comprising computer readable program code means for causing a computer to effect altering comprises computer readable program code means for causing a computer to effect altering the at least two of the plurality of process control variables on accordance with Random Evolutionary Operations (REVOP).

38. The article of manufacture of claim 27, further comprising computer redable program code means for causing a computer to effect determining whether to alter a set point for each of the at least two of the plurality of process control variables based on the effect.

39. The article of manufacture of claim 27, wherein the computer readable program code means for causing a computer to effect collecting process control data and the computer readable program code means for causing a computer to effect collecting output data comprise computer readable program code means for causing a computer to effect building a database.

40. The method of claim 1, wherein the collecting output data comprises collecting by testing equipment.

41. The system of claim 14, wherein the means for collecting output data comprises testing equipment.

42. The article of manufacture of claim 27, wherein the computer readable program code means for causing a computer to effect collecting output data comprises computer readable program code means for causing a computer to effect collecting by automated testing equipment.

43. The method of claim 12, further comprising altering at least one set point for the at least two of the plurality of process control variables.

44. The system of claim 25, further comprising means for altering at least one set point for the at least two of the plurality of process control variables.

45. The article of manufacture of claim 38, further comprising computer readable program code means for causing a computer to effect altering at least one set point for the at least two plurality of process control variables.

46. The method of claim 12, further comprising repeating the method.

47. The system of claim 25, further comprising means for repeating the method.

48. The article of manufacture of claim 38, further comprising computer readable program code means for causing a computer to effect repeating the method.

* * * * *

UNITED STATES PATENT AND TRADEMARK OFFICE
CERTIFICATE OF CORRECTION

PATENT NO.    : 6,453,207 B1
DATED         : September 17, 2002
INVENTOR(S)   : Holmes et al.

It is certified that error appears in the above-identified patent and that said Letters Patent is hereby corrected as shown below:

Column 14,
Line 5, insert after the word altering -- comprises computer readable program code means for causing a computer to effect altering --
Lines 15 and 16, delete "further comprising" and insert -- wherein the --

Signed and Sealed this

Seventh Day of January, 2003

JAMES E. ROGAN
*Director of the United States Patent and Trademark Office*